United States Patent
Barany et al.

(10) Patent No.: US 10,742,927 B2
(45) Date of Patent: Aug. 11, 2020

(54) ENTRY ADAPTER FOR A CATV NETWORK

(71) Applicant: PPC BROADBAND, INC., East Syracuse, NY (US)

(72) Inventors: David A. Barany, Syracuse, NY (US); John M. Egan, Jr., Franktown, CO (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/385,717

(22) Filed: Apr. 16, 2019

(65) Prior Publication Data

US 2019/0320134 A1    Oct. 17, 2019

Related U.S. Application Data

(60) Provisional application No. 62/659,076, filed on Apr. 17, 2018.

(51) Int. Cl.
| | |
|---|---|
| *H04N 7/173* | (2011.01) |
| *H04N 7/10* | (2006.01) |
| *H04L 12/28* | (2006.01) |
| *H01P 1/213* | (2006.01) |
| *H04N 21/426* | (2011.01) |

(52) U.S. Cl.
CPC ............ *H04N 7/104* (2013.01); *H01P 1/213* (2013.01); *H04L 12/2801* (2013.01); *H04N 7/17309* (2013.01); *H04N 21/42676* (2013.01)

(58) Field of Classification Search
CPC ......... H04N 21/4788; H04N 21/44209; H04N 21/43615; H04N 21/6543; H04N 21/6547
USPC .................... 725/111, 118, 126, 127, 148
See application file for complete search history.

(56) References Cited

U.S. PATENT DOCUMENTS

| | | |
|---|---|---|
| 2008/0018413 A1 | 1/2008 | Strull et al. |
| 2010/0100918 A1 | 4/2010 | Egan, Jr. et al. |
| 2010/0251320 A1 | 9/2010 | Shafer et al. |
| 2011/0072472 A1 | 3/2011 | Wells et al. |
| 2013/0002958 A1 | 1/2013 | Labro |
| 2013/0227632 A1 | 8/2013 | Wells et al. |
| 2018/0007425 A1 | 1/2018 | Bailey et al. |

OTHER PUBLICATIONS

International Search Report and Written Opinion dated Jul. 10, 2019, PCT Application No. PCT/US2019/027677, pp. 1-11.

*Primary Examiner* — Jivka A Rabovianski
(74) *Attorney, Agent, or Firm* — MH2 Technology Law Group LLP (57) ABSTRACT

An entry adapter for a cable television (CATV) network includes a first signal separation device configured to separate downstream CATV signals into a first downstream high-frequency signal and a first downstream low-frequency signal based on a first cutoff frequency, a second signal separation device configured to separate the downstream CATV signals into a second downstream high-frequency signal and a second downstream low-frequency signal based on a second cutoff frequency, and a signal frequency sensor and selector device in selective communication with the first and second signal separation devices.

20 Claims, 3 Drawing Sheets

ENTRY ADAPTER FOR A CATV NETWORK

CROSS-REFERENCE TO RELATED APPLICATIONS

This application claims priority to U.S. provisional patent application Ser. No. 62/659,076, filed on Apr. 17, 2018, which is incorporated herein by reference in its entirety.

BACKGROUND

In cable television networks, bidirectional communication is generally provided by constraining the signals in different directions to different frequency bands. Commonly, low-frequency signals are used for upstream communication, while high-frequency signals are used for downstream communication. For example, the upstream communication band may be between 5 MHz and 42 MHz, while the downstream communication band may be between 54 MHz and 1218 MHz.

Entry devices may be used to receive upstream and downstream signals, split the signals, mitigate noise, or otherwise condition signals at or near a subscriber premises. Thus, the entry devices may include an upstream path and a downstream path. The upstream and downstream paths may be active or passive, and may be segregated based on the frequency of the signals, in a variety of ways.

Recently, there has been interest in higher-frequency signal communication with subscriber devices, in either or both of the upstream and/or downstream directions. However, many network devices may operate under the assumption that the frequency distinction between the upstream and downstream signals is in the traditional range noted above. Accordingly, such devices may not be configured for operation at such higher frequencies.

SUMMARY

An entry adapter for a cable television (CATV) network includes an input port configured to communicate upstream and downstream CATV signals with the CATV network, a splitter having a first leg and a second leg, the splitter being coupled to the input port, an active port configured to communicate upstream and downstream CATV signals with at least one subscriber device, and a first diplexer comprising a common terminal coupled to the first leg of the splitter, a high-frequency terminal, and a low-frequency terminal. The first diplexer is configured to receive downstream CATV signals from the splitter and separate the received downstream CATV signals into a high-frequency signal having a frequency of at least about 54 MHz at the high-frequency terminal, and a low-frequency signal having a frequency less than about 42 MHz at the low-frequency terminal. The entry adapter also includes a second diplexer coupled to the active port and comprising a high-frequency terminal in communication with the high-frequency terminal of the first diplexer, a low-frequency terminal in communication with the low-frequency terminal of the first diplexer, and a common terminal, a first amplifier coupled to the high-frequency terminals of the first and second diplexers, a second amplifier coupled with the low-frequency terminals of the first and second diplexers, a first signal path extending from the first leg of the splitter and including a first high-frequency signal path between the high-frequency terminals of the first and second diplexers and through the first amplifier. The first amplifier is configured to block signals from proceeding from the second diplexer to the first diplexer via the first high-frequency signal path, and to amplify the downstream CATV signal in the first high-frequency signal path. The first signal path also includes a first low-frequency signal path between the low-frequency terminals of the first and second diplexers and through the second amplifier. The second amplifier is configured to block signals from proceeding from the first diplexer to the second diplexer via the first low-frequency signal path, and to amplify the upstream CATV signal in the first low-frequency signal path. The entry adapter further includes a third diplexer including a common terminal coupled to the second leg of the splitter, a high-frequency terminal, and a low-frequency terminal. The third diplexer is configured to separate downstream CATV signals having a frequency of at least about 258 MHz at the high-frequency terminal thereof and downstream CATV signals having a frequency of less than about 200 MHz at the low-frequency terminal thereof. The entry adapter also includes a fourth diplexer coupled to the active port, and having a high-frequency terminal coupled to the high-frequency terminal of the third diplexer, and a low-frequency terminal coupled to the low-frequency terminal of the third diplexer, a third amplifier coupled with the high-frequency terminal of the third diplexer and with the high-frequency terminal of the fourth diplexer, a fourth amplifier coupled with the low-frequency terminal of the third diplexer and with the low-frequency terminal of the fourth diplexer, and a second signal path including a second high-frequency signal path between the high-frequency terminals of the third and fourth diplexers and through the third amplifier. The third amplifier is configured to block signals from proceeding from the fourth diplexer to the third diplexer via the second high-frequency signal path, and to amplify the downstream CATV signal in the second high-frequency signal path. The second signal path also includes a second low-frequency signal path between the low-frequency terminals of the third and fourth diplexers and through the fourth amplifier. The fourth amplifier is configured to block signal from proceeding from the third diplexer to the fourth diplexer via the second low-frequency signal path, and to amplify an upstream CATV signal in the second low-frequency signal path. The entry adapter further includes a signal frequency sensor and selector device in selective communication with the first and second signal paths. The signal frequency sensor and selector device is configured to detect a frequency of an upstream CATV signal received from the active port to a selected one of the first or second signal paths, and is configured to route the upstream CATV signals to first signal path in response to detecting that the frequency of the upstream CATV signals is less than about 54 MHz, and to route the upstream CATV signals to the second signal path in response to detecting that the frequency of the upstream CATV signals is greater than about 54 MHz. The signal frequency sensor and selector device includes a sensor configured to detect a frequency of the upstream CATV signals, and a switch in communication with the sensor. The switch has a first state in which the switch is configured to route the upstream CATV signals to the first signal path, and a second state in which the switch is configured to route the upstream CATV signals to the second signal path.

An entry adapter for a cable television (CATV) network includes an input port configured to communicate upstream and downstream CATV signals with the CATV network, an active port configured to communicate upstream and downstream CATV signals with at least one subscriber device, a first signal separation device coupled to the input port, wherein the first signal separation device is configured to receive downstream signals from the input port and separate the received downstream signals into a high-frequency signal having a frequency of at least about 258 MHz, and a low-frequency signal having a frequency less than about 200 MHz, a second signal separation device coupled to the active port, and an amplifier coupled to the first and second signal separation devices, the amplifier being configured to amplify downstream signals and block upstream signals. The amplifier is configured to receive the high-frequency signal from the first signal separation device, and not receive the low-frequency signal from the first signal separation device, to amplify the high-frequency signal, and to provide the amplified high-frequency signal to the second signal separation device, and the second signal separation device is configured to provide the amplified high-frequency signal to the active port.

An entry adapter for a cable television (CATV) network including a first signal separation device configured to separate downstream CATV signals into a first downstream high-frequency signal and a first downstream low-frequency signal based on a first cutoff frequency that is between a frequency range of the first high-frequency signal and a frequency range of the second low-frequency signal, a second signal separation device configured to separate the downstream CATV signals into a second downstream high-frequency signal and a second downstream low-frequency signal based on a second cutoff frequency that is between a frequency range of the second high-frequency signal and between a frequency range the second low-frequency signal, the second cutoff frequency being higher than the first cutoff frequency, and a signal frequency sensor and selector device in selective communication with the first and second signal separation devices. The signal frequency sensor and selector device is configured to receive an upstream CATV signal, determine that the upstream CATV signal is above the second cutoff frequency, and in response to determining that the upstream CATV signal is above the second cutoff frequency, route the upstream CATV signal toward the second signal separation device and not toward the first signal separation device.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

Figure 1:
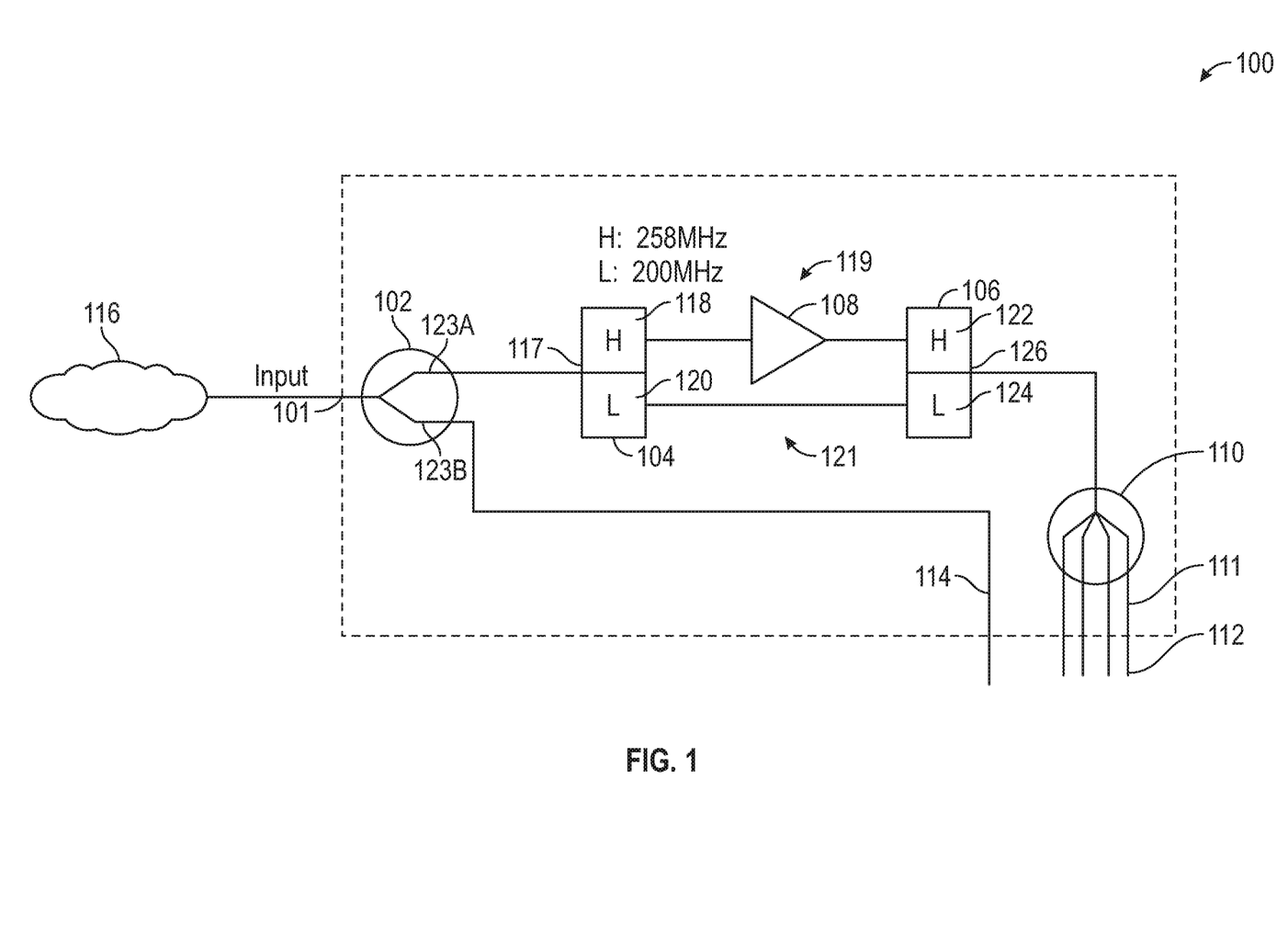
FIG. 1 illustrates a functional block diagram of an entry adapter, according to an embodiment.

FIG. 1 illustrates a functional block diagram of an entry adapter 100 for use in a cable television (CATV) network, according to an embodiment. The entry adapter 100 may be configured to send, receive, and/or condition radiofrequency (RF) signals of any type, e.g., CATV signals, as will be described in greater detail below. The entry adapter 100 may include an input 101, a first splitter 102, a first signal separation device (e.g., a diplexer) 104, a second signal separation device (e.g., a diplexer) 106, a signal conditioning device (e.g., an amplifier) 108, a second splitter 110, a plurality of active outputs 112, and one or more passive outputs 114. As the term is used herein, "active outputs" are those ports that receive a conditioned (e.g., amplified) signal, potentially in addition to an unconditioned signal, as will be described below. By contrast, the "passive outputs" are those that only receive unamplified signals. In this context, "unamplified" means not amplified within the adapter 100, as the signals may be amplified elsewhere in the CATV network.

As shown in FIG. 1, the input 101 may be coupled to a network 116, which may be the CATV network. The input 101 may receive downstream CATV signals therefrom and send upstream CATV signals thereto. In the "downstream" direction (e.g., in a direction from the network 116 to the subscriber devices coupled to the outputs 112, 114), the input 101 may receive the signals from the network 116, and pass the downstream signals to the first splitter 102. The first splitter 102 may have two legs 123A, 123B, which may provide copies of the signal (e.g., at lower strength). The second leg 123B may be connected to the passive output 114. The path between the first splitter 102 and the passive output 114 may have no components or at least no components that require external power (i.e., active components), other than what is provided by the RF signals, to operate. The passive signal path may also not include any splitters between the first splitter 102 and the passive output 114, thereby minimizing losses in the signal provided to the passive output 114. The passive output 114 may thus be considered a "low-loss" output.

The first leg 123A of the first splitter 102 may be connected to a common terminal 117 of the first diplexer 104. The first diplexer 104 may be configured to separate and/or combine CATV signals based on a frequency thereof. For example, the first diplexer 104 may pass a high-frequency component of the downstream CATV signal to the high-frequency terminal 118 thereof, and pass a low-frequency component of the downstream CATV signal to the low-frequency terminal 120 thereof, with non-passed portions of the downstream CATV signal being blocked from reaching the respective terminals 118, 120. For example, first diplexer 104 may be configured to pass downstream CATV signals having a frequency below about 200 MHz to the low-frequency terminal 120, and may be configured to pass downstream CATV signals having a frequency above about 258 MHz to the high-frequency terminal 118. In other words, the cutoff frequency may be between the frequency ranges of the downstream and upstream CATV signals, or may be at the extreme of one or both ranges, thus allowing the diplexers 104, 106 to distinguish between the two types of CATV signals. It will be appreciated that these specific frequency "cutoffs" are merely examples and not to be considered limiting unless otherwise specified herein.

The first diplexer 104 may also be configured to pass high-frequency signals in the upstream direction between the high-frequency terminal and the common terminal 117, and to pass low-frequency signals in the upstream direction from the low-frequency terminal 120 to the common terminal 117, again adhering to the cutoff(s) mentioned above.

Accordingly, two signal paths are provided between the first and second diplexers 104, 106: a high-frequency path 119 and a low-frequency path 121. The high-frequency path 119 may extend from the high-frequency terminal 118 of the first diplexer 104 may be connected to the amplifier 108. The amplifier 108 may be configured to amplify the downstream signals and pass the downstream signals to a high-frequency terminal 122 of the second diplexer 106. The high-frequency signals may then pass to a common terminal 126 of the second diplexer 106, representing the end of the high-frequency path 119.

The second diplexer 106 may also be configured to separate and/or combine CATV signals based on a frequency thereof. For example, the low-frequency path 121 may extend parallel to the high-frequency path 119 and from the low-frequency terminal 120 of the first diplexer 104 to a low-frequency terminal 124 of the second diplexer 106. The low-frequency path 121 between the low-frequency terminals 120, 124 of the first and second diplexers 104, 106, respectively, may be bi-directional, allowing for either/both upstream and/or downstream signals to pass therebetween. In particular, the low-frequency terminals 120, 124 may be directly connected together, e.g., without any intervening components, such that the low-frequency path 121 extends directly between the low-frequency terminals 120, 124. Once arriving at the low-frequency terminal 124 of the second diplexer 106, the low-frequency signals may be passed to the common terminal 126, representing the end of the low-frequency path 121.

The second diplexer 106 may be configured similarly to the first diplexer 104, and may thus pass the same or similar frequencies from the high and low-frequency terminals 122, 124 to a common terminal 126 of the second diplexer 106 as those mentioned above for the first diplexer 104.

The common terminal 126 of the second diplexer 106 may be connected to the second splitter 110. Thus, signals that pass through the high and low-frequency terminals 122, 124 to the common terminal 126 may be sent to the second splitter 110. The second splitter 110 may be a two-way, four-way (as shown), or any other way splitter. The splitter 110 may include one or more two-way splitters, e.g., in a cascading arrangement. The splitter 110 may be configured as a resistive splitter or configured to split/combine signals in any other suitable manner. The second splitter 110 may have a plurality of legs 111, which may be coupled to the active outputs 112, and may provide the downstream signals thereto and/or receive upstream signals therefrom.

The active outputs 112 may thus receive signals that vary in strength depending on the frequency at which they are provided. For example, the higher frequency signals, passed through the high-frequency path 119 in a downstream direction are amplified by the amplifier 108, and may thus have substantially a zero decibel (dB) strength loss from the input 101 to the output 112. By contrast, the lower frequency signals, passed through the low-frequency path 121, may arrive at the active outputs 112 with a strength loss between about 8 dB and about 16 dB, e.g., about a 12 dB strength reduction, from input 101 to active outputs 112. In some situations, this configuration is provided because strength losses in the low-frequency signals below about 200 MHz may be negligible, while the amplifier 108 may condition the high-frequency signals to mitigate losses.

In the upstream direction, upstream CATV signals may be received from the active outputs 112 and provided to the common terminal 126 of the second diplexer 106. The second diplexer 106 may split the upstream CATV signal based on a frequency thereof, passing high-frequency components to the high-frequency terminal 122, and low-frequency components to the low-frequency terminal 124. The upstream signals in the high-frequency range may be blocked from proceeding through the high-frequency path 119 by the amplifier 108; however, low-frequency signals may pass through the low-frequency path 121 to the low-frequency terminal 120 of the first diplexer 104, then to the first splitter 102, and to the input 101 and/or to the passive output 114. The second diplexer 106 may have the same cutoff frequency or frequencies as the first diplexer 104.

Figure 2:
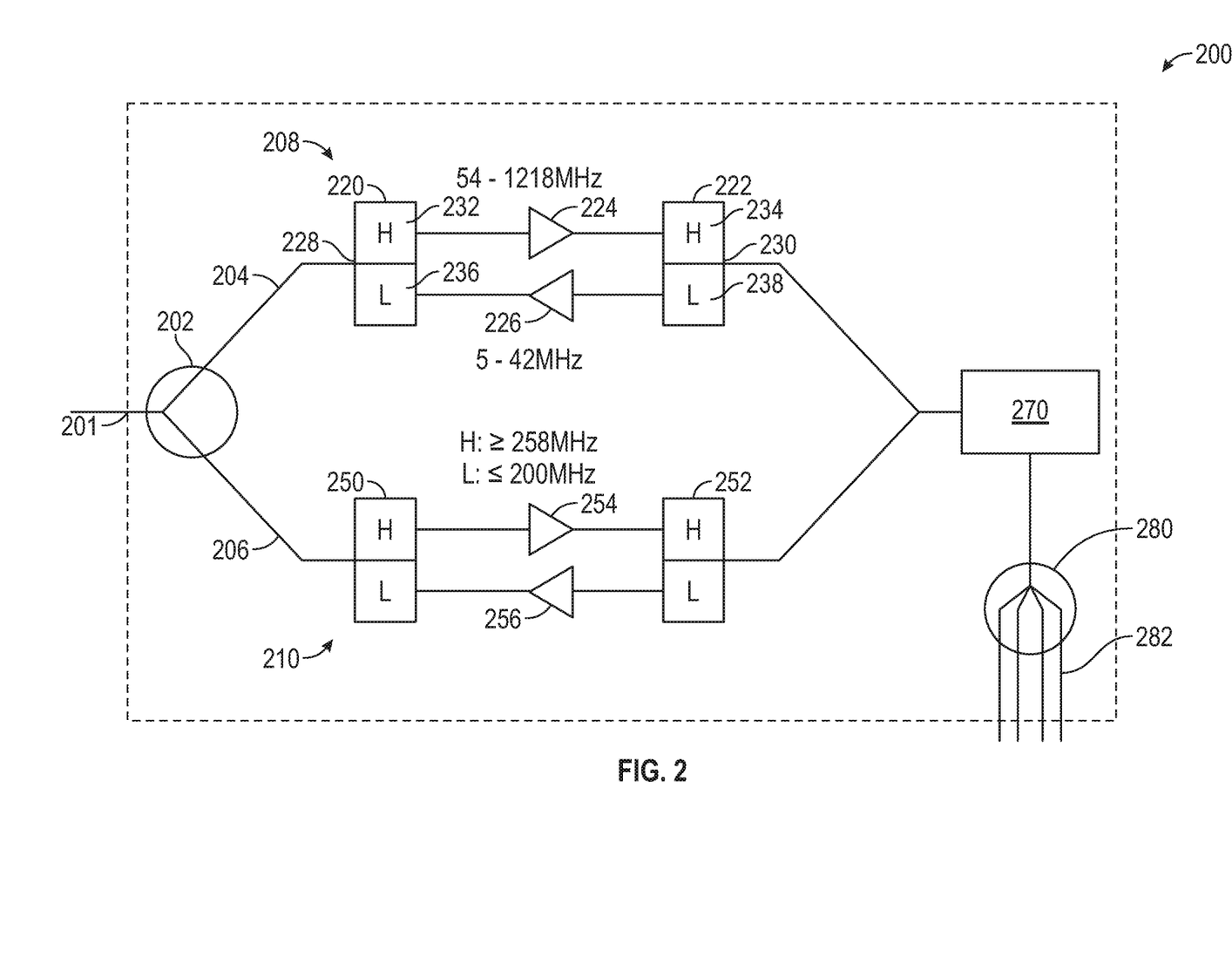
FIG. 2 illustrates a functional block diagram of another entry adapter, according to another embodiment.

FIG. 2 illustrates a functional block diagram of another entry adapter 200, according to an embodiment. The entry adapter 200 may also include an input 201 configured to be connected to a network and thus communicate signals therewith. The input 201 may be connected to a first splitter 202, which may include two or more legs 204, 206. The leg 204 may be connected to a first signal path 208, and the leg 204 may be connected to a second signal path 210. In this embodiment, both of the signal paths 208, 210 may be active, each providing conditioning (e.g., amplification) for the upstream and downstream CATV signals that pass therethrough. Thus, the entry adapter 200 may be configured similarly to the entry adapter 100, except that the entry adapter 200 has two active signals paths 208, 210, rather than one active path and one passive path.

For example, the first signal path 208 may include a first signal separation device (e.g., diplexer) 220, a second signal separation device (e.g., a diplexer) 222, a first signal conditioning device (e.g., an amplifier) 224, and a second signal conditioning device (e.g., an amplifier) 226. The first amplifier 224 may be positioned between high-frequency terminals 232, 234 of the first and second diplexers 220, 222. The second amplifier 226 may be positioned between low-frequency terminals 236, 238 of the first and second diplexers 220, 222. The first amplifier 224 may amplify signals in the downstream direction and block signals in the upstream direction. The second amplifier 226 may amplify signals in the upstream direction and block signals in the downstream direction. Further, in both diplexers 220, 222, high-frequency signals may pass between a common terminal 228, 230 and the high-frequency terminal 232, 234, while low-frequency signals may pass between the common terminal 228, 230 and a low-frequency terminal 236, 238, with signals that are not passed being blocked. The second signal path 210 may operate similarly, with two (third and fourth) signal separation devices (e.g., diplexers) 250, 252, and signal conditioning devices (e.g., amplifiers) 254, 256 therebetween.

The first and second diplexers 220, 222 may be configured to pass 5-42 MHz signals to/from the low-frequency terminals, and 54-1218 MHz signals to/from the high-frequency terminals (e.g., the cutoff frequency is between 42 MHz and 54 MHz, or may be at one of these frequencies). Further, the third and fourth diplexers 250, 252 may be configured to pass signals having a frequency greater than or equal to 258 MHz to/from the high-frequency terminals, and less than or equal to 200 MHz to/from the low-frequency terminals, and thus may operate at a second, different cutoff frequency than the first and second diplexers 220, 222. Thus, the adapter 200 may be configured to operate in two different sets of frequency bands for downstream and upstream communications, one in the first signal path 208 with a lower cutoff frequency separating upstream CATV signals from downstream CATV signals, and another in the second signal path 210 with a higher cutoff frequency between upstream and downstream CATV signals.

The entry adapter 200 may also include a signal frequency sensor and selector device 270. The signal frequency sensor and selector device 270 may be configured to detect (whether manually or automatically) which set of frequency bands are in operation in the network, and route signals to/from the first or second signal paths 208, 210 accordingly. This may allow the entry adapter 200 to be adaptive to multiple different network frequency regimes.

The entry adapter 200 may further include a second splitter 280 and a plurality of active outputs 282, which may be the same or similar in structure and function as the second splitter 110 described above with respect to FIG. 1.

Figure 3:
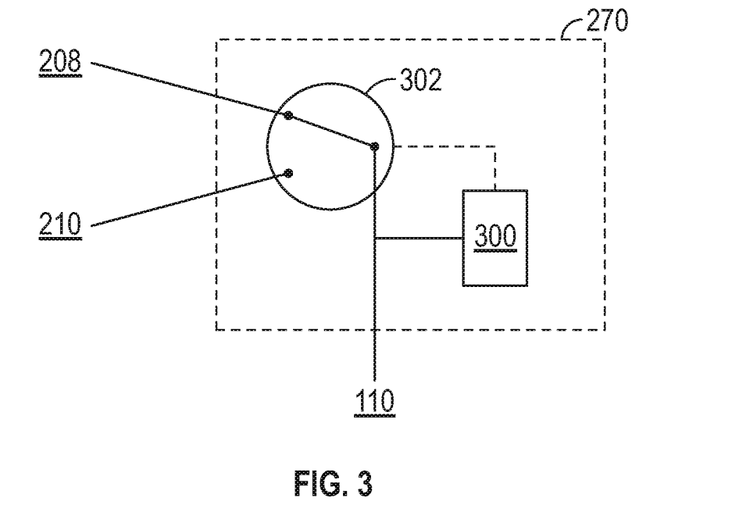
FIG. 3 illustrates a functional block diagram of a signal power sensor device, according to an embodiment.

FIG. 3 illustrates a block diagram of a signal frequency sensor and selector device 270, according to an embodiment. The signal frequency sensor and selector device 270 may include a sensor 300 and a switch 302. The switch 302 may be a solid-state switch, electromechanical relay, or any other suitable type of switch, without limitation. The sensor 300 may be configured to detect a power spectrum, or at least a power level above/below a predetermined frequency, of upstream CATV signals coming from the active ports 112, e.g., via the splitter 110.

If the sensor 300 determines that a predetermined portion of the signal power of the upstream CATV signal is below a predetermined frequency threshold (e.g., about 54 MHz), the sensor 300 may cause the switch 302 to route the upstream CATV signals to the first signal path 208, as shown. This may be referred to as the first "state" of the signal frequency sensor and selector device 270 and/or of the switch 302. Otherwise, if the sensor 300 determines that the predetermined portion of the signal power is above the predetermined frequency threshold, the sensor 300 may cause the switch 302 to actuate to a second state, thereby routing the upstream CATV signals to the second signal path 210. It will be appreciated that whichever path 208, 210 that the switch 302 connects to may be considered the "selected" path, and bi-directional communication therethrough may be enabled, while communication in either or both of the upstream and downstream directions may be disabled or otherwise blocked with the non-selected path 208, 210.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. An entry adapter for a cable television (CATV) network, comprising:
   an input port configured to communicate upstream and downstream CATV signals with the CATV network;
   a splitter having a first leg and a second leg, the splitter being coupled to the input port;
   an active port configured to communicate upstream and downstream CATV signals with at least one subscriber device;
   a first diplexer comprising a common terminal coupled to the first leg of the splitter, a high-frequency terminal, and a low-frequency terminal, wherein the first diplexer is configured to receive downstream CATV signals from the splitter and separate the received downstream CATV signals into a high-frequency signal having a frequency of at least about 54 MHz at the high-frequency terminal, and a low-frequency signal having a frequency less than about 42 MHz at the low-frequency terminal;
a second diplexer coupled to the active port and comprising a high-frequency terminal in communication with the high-frequency terminal of the first diplexer, a low-frequency terminal in communication with the low-frequency terminal of the first diplexer, and a common terminal;
a first amplifier coupled to the high-frequency terminals of the first and second diplexers;
a second amplifier coupled with the low-frequency terminals of the first and second diplexers;
a first signal path extending from the first leg of the splitter and comprising:
  a first high-frequency signal path between the high-frequency terminals of the first and second diplexers and through the first amplifier, wherein the first amplifier is configured to block signals from proceeding from the second diplexer to the first diplexer via the first high-frequency signal path, and to amplify the downstream CATV signal in the first high-frequency signal path; and
  a first low-frequency signal path between the low-frequency terminals of the first and second diplexers and through the second amplifier, wherein the second amplifier is configured to block signals from proceeding from the first diplexer to the second diplexer via the first low-frequency signal path, and to amplify the upstream CATV signal in the first low-frequency signal path;
a third diplexer comprising a common terminal coupled to the second leg of the splitter, a high-frequency terminal, and a low-frequency terminal, wherein the third diplexer is configured to separate downstream CATV signals having a frequency of at least about 258 MHz at the high-frequency terminal thereof and downstream CATV signals having a frequency of less than about 200 MHz at the low-frequency terminal thereof; and
a fourth diplexer coupled to the active port, and having a high-frequency terminal coupled to the high-frequency terminal of the third diplexer, and a low-frequency terminal coupled to the low-frequency terminal of the third diplexer;
a third amplifier coupled with the high-frequency terminal of the third diplexer and with the high-frequency terminal of the fourth diplexer;
a fourth amplifier coupled with the low-frequency terminal of the third diplexer and with the low-frequency terminal of the fourth diplexer;
a second signal path comprising:
  a second high-frequency signal path between the high-frequency terminals of the third and fourth diplexers and through the third amplifier, wherein the third amplifier is configured to block signals from proceeding from the fourth diplexer to the third diplexer via the second high-frequency signal path, and to amplify the downstream CATV signal in the second high-frequency signal path; and
  a second low-frequency signal path between the low-frequency terminals of the third and fourth diplexers and through the fourth amplifier, wherein the fourth amplifier is configured to block signal from proceeding from the third diplexer to the fourth diplexer via the second low-frequency signal path, and to amplify an upstream CATV signal in the second low-frequency signal path; and
a signal frequency sensor and selector device in selective communication with the first and second signal paths, wherein the signal frequency sensor and selector device is configured to detect a frequency of an upstream CATV signal received from the active port to a selected one of the first or second signal paths, wherein the signal frequency sensor and selector device is configured to route the upstream CATV signals to first signal path in response to detecting that the frequency of the upstream CATV signals is less than about 54 MHz, and to route the upstream CATV signals to the second signal path in response to detecting that the frequency of the upstream CATV signals is greater than about 54 MHz, and
wherein the signal frequency sensor and selector device comprises:
  a sensor configured to detect a frequency of the upstream CATV signals; and
  a switch in communication with the sensor, wherein the switch has a first state in which the switch is configured to route the upstream CATV signals to the first signal path, and a second state in which the switch is configured to route the upstream CATV signals to the second signal path.

2. An entry adapter for a cable television (CATV) network, comprising:
an input port configured to communicate upstream and downstream CATV signals with the CATV network;
an active port configured to communicate upstream and downstream CATV signals with at least one subscriber device;
a first signal separation device coupled to the input port, wherein the first signal separation device is configured to receive downstream signals from the input port and separate the received downstream signals into a high-frequency signal having a frequency of at least about 258 MHz, and a low-frequency signal having a frequency less than about 200 MHz;
a second signal separation device coupled to the active port; and
an amplifier coupled to the first and second signal separation devices, the amplifier being configured to amplify downstream signals and block upstream signals, wherein the amplifier is configured to receive the high-frequency signal from the first signal separation device, and not receive the low-frequency signal from the first signal separation device, to amplify the high-frequency signal, and to provide the amplified high-frequency signal to the second signal separation device, wherein the second signal separation device is configured to provide the amplified high-frequency signal to the active port.

3. The entry adapter of claim 2, wherein the first signal separation device comprises a low-frequency terminal, and the second signal separation device comprises a low-frequency terminal configured to communicate the low-frequency signal with the low-frequency terminal of the first signal separation device, and wherein the low-frequency terminals are coupled directly together with no intervening components.

4. The entry adapter of claim 2, wherein the first signal separation device further comprises a high-frequency terminal, and the second signal separation device further comprises a high frequency terminal, wherein the amplifier is coupled to the high-frequency terminals, and wherein the amplifier is configured to amplify the high-frequency signal proceeding from the high-frequency terminal of the first signal separation device to the high-frequency terminal of the second frequency separation device, and to block high-frequency signals proceeding from the high-frequency terminal of the second signal separation device to the high-frequency terminal of the first signal separation device.

5. The entry adapter of claim 2, further comprising:
a splitter having a first leg and a second leg, the splitter being coupled to the input port; and
a passive port coupled directly to the second leg of the splitter,
wherein the first signal separation device is coupled to the first leg of the splitter.

6. The entry adapter of claim 2, further comprising:
a splitter having a first leg and a second leg, the splitter being coupled to the input port, and the first leg being coupled to the first signal separation device;
a third signal separation device coupled to the second leg, wherein the third signal separation device comprises a high-frequency terminal and a low-frequency terminal, and wherein the third signal separation device is configured to separate downstream CATV signals having a frequency of about 54 MHz to about 1218 MHz at the high-frequency terminal thereof and downstream CATV signals having a frequency of about 5 MHz to about 42 MHz at the low-frequency terminal thereof; and
a fourth signal separation device coupled to the active port, and having a high-frequency terminal coupled to the high-frequency terminal of the third signal separation device, and a low-frequency terminal coupled to the low-frequency terminal of the third signal separation device.

7. The entry adapter of claim 6, further comprising a second amplifier coupled with the low-frequency terminal of the first signal separation device and with the low-frequency terminal of the second signal separation device, wherein the second amplifier is configured to amplify signals in the upstream direction and block signals in the downstream direction.

8. The entry adapter of claim 6, further comprising a third amplifier coupled with the high-frequency terminal of the third signal separation device and with the high-frequency terminal of the fourth signal separation device, wherein the third amplifier is configured to amplify signals in the downstream direction and block signals in the upstream direction.

9. The entry adapter of claim 6, further comprising a fourth amplifier coupled with the low-frequency terminal of the third signal separation device and with the low-frequency terminal of the fourth signal separation device, wherein the fourth amplifier is configured to amplify signals in the upstream direction and block signals in the downstream direction.

10. The entry adapter of claim 6, further comprising a signal frequency sensor and selector device configured to detect a frequency of an upstream CATV signal received from the active port, wherein the signal frequency sensor and selector device is configured to route the upstream CATV signals to the second signal separation device in response to detecting that the frequency of the upstream CATV signals is greater than about 54 MHz, and to route the upstream CATV signals to third signal separation device in response to detecting that the frequency of the upstream CATV signals is less than about 54 MHz.

11. An entry adapter for a cable television (CATV) network, comprising:
a first signal separation device configured to separate downstream CATV signals into a first downstream high-frequency signal and a first downstream low-frequency signal based on a first cutoff frequency that is between a frequency range of the first high-frequency signal and a frequency range of the second low-frequency signal;
a second signal separation device configured to separate the downstream CATV signals into a second downstream high-frequency signal and a second downstream low-frequency signal based on a second cutoff frequency that is between a frequency range of the second high-frequency signal and between a frequency range the second low-frequency signal, wherein the second cutoff frequency is higher than the first cutoff frequency; and
a signal frequency sensor and selector device in selective communication with the first and second signal separation devices, wherein the signal frequency sensor and selector device is configured to:
receive an upstream CATV signal;
determine that the upstream CATV signal is above the second cutoff frequency; and
in response to determining that the upstream CATV signal is above the second cutoff frequency, route the upstream CATV signal toward the second signal separation device and not toward the first signal separation device.

12. The entry adapter of claim 11, further comprising a signal conditioning device configured to amplify the first downstream high frequency signal.

13. The entry adapter of claim 12, wherein the signal conditioning device comprises an amplifier.

14. The entry adapter of claim 11, further comprising a splitter having a first leg coupled to the first signal separation device, and a second leg coupled to the second signal separation device, wherein the splitter is configured to receive downstream CATV signals from an input port and provide the downstream CATV signals to the first and second signal separation devices, and wherein the splitter is configured to receive upstream CATV signals form the first and second signal separation devices and provide the upstream CATV signals to the input port.

15. The entry adapter of claim 11, further comprising a third signal separation device configured to receive the first downstream high frequency signal and provide the first downstream high frequency signal to the signal frequency sensor and selector device, and to receive the upstream CATV signals from the signal frequency sensor and selector device when the signal sensor and selector device routes the upstream CATV signals thereto.

16. The entry adapter of claim 15, further comprising a fourth signal separation device configured to receive the second downstream high frequency signal and provide the second downstream high frequency signal to the signal frequency sensor and selector device, and to receive the upstream CATV signals from the signal frequency sensor and selector device when the signal sensor and selector device routes the upstream CATV signals thereto.

17. The entry adapter of claim 11, wherein the signal frequency sensor comprises:
a sensor configured to detect a frequency of the upstream CATV signals; and
a switch in communication with the sensor, wherein the switch has a first state in which the switch is configured to route the upstream CATV signals to first signal separation device, and a second state in which the switch is configured to route the upstream CATV signals to the second signal separation device.

18. The entry adapter of claim 11, wherein first cutoff frequency is between about 42 MHz and about 54 MHz.

19. The entry adapter of claim 18, wherein the second cutoff frequency is between about 200 MHz and about 258 MHz.

20. The entry adapter of claim 11, wherein the first signal separation device comprises a diplexer, and wherein the second signal separation device comprises a diplexer.

* * * * *